United States Patent
Tseng et al.

(10) Patent No.: US 9,008,098 B2
(45) Date of Patent: Apr. 14, 2015

(54) NETWORK COMMUNICATION SYSTEM AND NETWORK COMMUNICATION METHOD

(71) Applicants: Inventec (Pudong) Technology Corporation, Shanghaid (CN); Inventec Corporation, Taipei (TW)

(72) Inventors: Jenn-Huei Tseng, Taipei (TW); Shih-Hao Wu, Taipei (TW); Yi-Kuan Wu, Taipei (TW); Te-Yen Liu, Taipei (TW)

(73) Assignees: Inventec (Pudong) Technology Corporation, Shanghai (CN); Inventec Corporation, Taipei (TW)

( * ) Notice: Subject to any disclaimer, the term of this patent is extended or adjusted under 35 U.S.C. 154(b) by 156 days.

(21) Appl. No.: 13/802,141

(22) Filed: Mar. 13, 2013

(65) Prior Publication Data

US 2014/0119375 A1   May 1, 2014

(30) Foreign Application Priority Data

Oct. 29, 2012   (CN) .......................... 2012 1 0422005

(51) Int. Cl.
*H04L 12/28* (2006.01)
*H04L 12/743* (2013.01)
*H04L 12/931* (2013.01)
*H04L 12/935* (2013.01)

(52) U.S. Cl.
CPC ............ *H04L 45/7457* (2013.01); *H04L 49/70* (2013.01); *H04L 49/3009* (2013.01)

(58) Field of Classification Search
None
See application file for complete search history.

(56) References Cited

U.S. PATENT DOCUMENTS

| | | | |
|---|---|---|---|
| 2009/0097490 A1* | 4/2009 | Sanderson et al. ........ | 370/395.53 |
| 2011/0075667 A1* | 3/2011 | Li et al. ......................... | 370/392 |
| 2012/0207026 A1* | 8/2012 | Sato ............................. | 370/237 |
| 2013/0124750 A1* | 5/2013 | Anumala et al. .............. | 709/232 |
| 2013/0322446 A1* | 12/2013 | Biswas et al. ................. | 370/392 |
| 2013/0329548 A1* | 12/2013 | Nakil et al. ................... | 370/228 |
| 2013/0332602 A1* | 12/2013 | Nakil et al. ................... | 709/224 |
| 2014/0098815 A1* | 4/2014 | Mishra et al. ................. | 370/390 |

* cited by examiner

*Primary Examiner* — Chi H Pham
*Assistant Examiner* — Soon-Dong D Hyun
(74) *Attorney, Agent, or Firm* — Huffman Law Group, PC

(57) ABSTRACT

A network communication system comprises a cloud network and at least one physical machine. The cloud network comprises at least one physical switch. Each the physical machine comprises a plurality of virtual machines and a virtual switch. Each of the virtual machines is connected to the at least one physical switch in the cloud network through the virtual switch. The virtual switch encapsulates a destination machine address of an egress frame sent by the virtual machines, attaches a destination switch address to the egress frame to be forwarded to the at least one physical switch, and receives and analyzes an ingress frame obtained from the at least one physical switch, so as to convert the destination switch address of the ingress frame to the destination machine address, for forwarding the ingress frame to one of the virtual machines.

19 Claims, 4 Drawing Sheets

NETWORK COMMUNICATION SYSTEM AND NETWORK COMMUNICATION METHOD

CROSS-REFERENCE TO RELATED APPLICATIONS

This non-provisional application claims priority under 35 U.S.C. §119(a) on Patent Application No(s). 201210422005.4 filed in China, P.R.C. on 29 Oct. 2012, the entire contents of which are hereby incorporated by reference.

BACKGROUND OF THE INVENTION

1. Technical Field of the Invention

The disclosure relates to a communication technology, more particularly to a network communication system and a network communication method thereof.

2. Description of the Related Art

With the growth of the computer technology and the Internet, cloud computing applications are increasingly popular. In a cloud operation network, a user is able to use resources for calculation, data access and storage provided by the cloud operation without needing to know the location and other details of infrastructures for calculation. A device having lower operation capability (for example, a cell phone) is able to process data by using the resources of other computers in the cloud network, so that the device can provide functions that can only be executed by a computer having high operation capability (for example, a server).

The cloud network is provided with numerous network elements (for example, switches or routers). The network elements are connected to physical machines and nearby network elements, for rapidly transferring network packets to implement the cloud network. Conventionally, a core network element located in the center of the cloud network and an edge network element directly coupled to the physical machines need to record media access control (MAC) addresses of every virtual machine in the cloud network. Each network element requires a large and rapidly accessible memory to store the virtual machine addresses. This is rather expensive. The core and edge network elements of the cloud network are connected relatively to the physical machines. Currently, it is possible to reduce the memory space (for example, a Content Addressable Memory (CAM)) of the core network element for recording the virtual machine addresses through Transparent Interconnect of Lots of Links (TRILL). Nevertheless, edge network elements still require significant memory space.

Specifically, the edge network element has to record the MAC addresses of all of the virtual machines in a plurality of physical servers connected to the edge network element. Accordingly, the edge network element has to have memory space sufficient to store MAC addresses of all of the virtual machines. Therefore, as the number of virtual machines increases, memory costs increase because more network addresses need to be recorded.

SUMMARY OF THE INVENTION

In view of the above problems, the disclosure provides a network communication system, which is configured for effectively reducing the amount of media access addresses required to be recorded by an edge network element, and reducing memory space provided in the edge network element, thereby reducing the cost.

The disclosure provides a network communication system, comprising a cloud network and at least one physical machine. The cloud network comprises at least one physical switch. Each physical machine comprises a virtual switch and a plurality of virtual machines, and each virtual machine is connected to at least one physical switch in the cloud network through the virtual switch. The virtual switch encapsulates a destination machine address of an egress frame sent by the plurality of virtual machines, attaches a destination switch address to the egress frame, and forwards the egress frame to the at least one physical switch; and receives and analyzes an ingress frame obtained from the at least one physical switch, converts the destination switch address of the ingress frame to the destination machine address, and forwards the ingress frame to one of the plurality of virtual machines.

In an embodiment of the disclosure, the virtual switch comprises a first address record table, for recording media access control (MAC) addresses of the virtual machines and at least one physical switch connected to the virtual machines.

In an embodiment of the disclosure, the at least one physical switch comprises a second address record table, for recording a MAC address of every physical switch in the cloud network.

In an embodiment of the disclosure, the destination machine address of the egress frame is a MAC address of a destination virtual machine in the cloud network.

In an embodiment of the disclosure, the destination switch address of the egress frame is a MAC address of a destination physical switch, connected to the destination virtual machine, in the cloud network.

In an embodiment of the disclosure, the virtual switch is a network server program of the at least one physical machine.

The disclosure further provides a network communication method, applicable to at least one physical machine of a network communication system. In the method, an egress frame from one of a plurality of virtual machines is received, the plurality of virtual machines being located in the at least one physical machine. A destination machine address of the egress frame is encapsulated. A destination switch address is attached to the egress frame. The egress frame is forwarded to the at least one physical switch.

Technical details of the network communication method are the same as those of the network communication system, and are not repeated herein.

In view of the above, in the network communication system described in embodiments of the disclosure, each virtual machine is connected to the physical switch through the virtual switch disposed inside the physical machine, so that the physical switch is configured for achieving frame transferring of the cloud network by only requiring to record a machine address of the virtual switch in the physical machine connected to the physical switch. Therefore, by effectively reducing the storage space, for recording the machine addresses, in the physical switch, a manufacturer can select a memory having lower storage capacity to setup a physical switch, thereby reducing the cost.

BRIEF DESCRIPTION OF THE DRAWINGS

The disclosure will become more fully understood from the detailed description given herein below for illustration only, and thus does not limit the disclosure, wherein.

DETAILED DESCRIPTION

Figure 1:
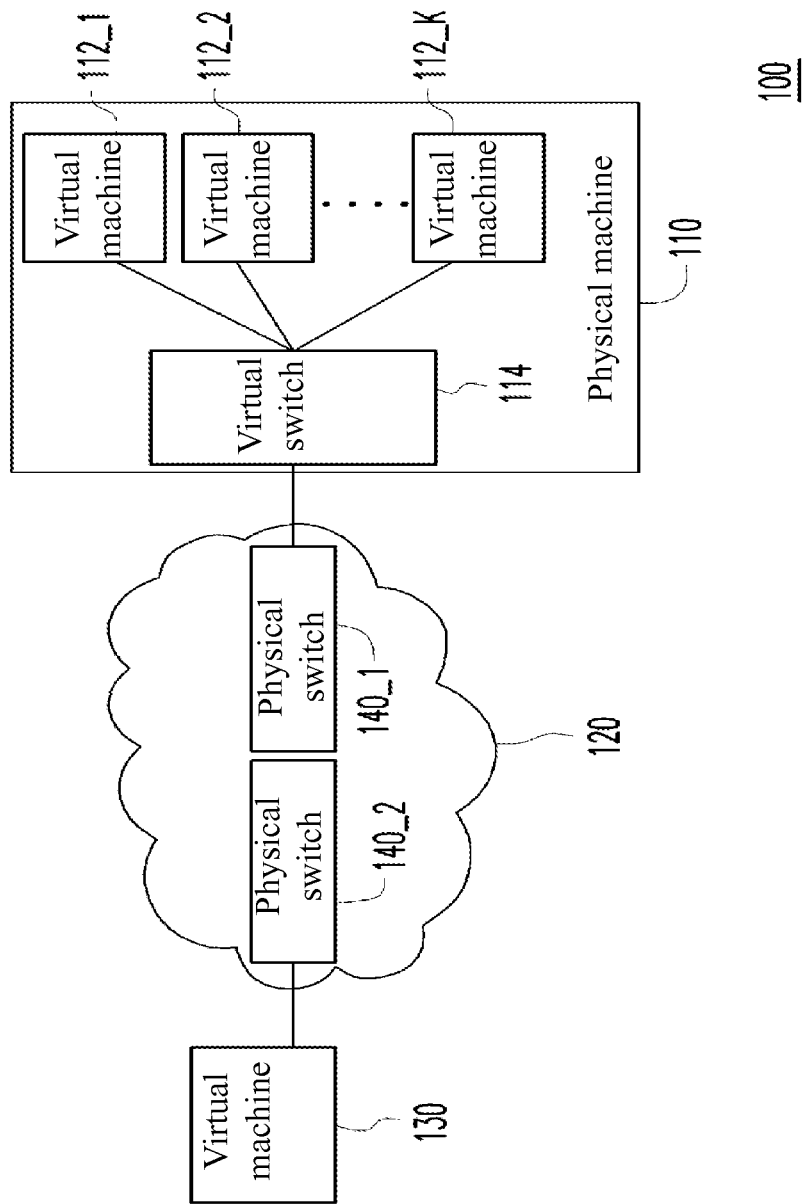
FIG. 1 is a block diagram of a network communication system according to a first embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In a cloud network, an edge network element (for example, a Top-of-Rack (ToR) switch) has to record media access control (MAC) addresses of all virtual machines, connected to the edge network element, in a memory thereof (for example, a Content Addressable Memory (CAM)), so that data of the virtual machine are configured for being transmitted in the cloud network through the edge network element. However, as the number of virtual machines increases, memory space in the edge network element has to be increased accordingly, so as to record the MAC addresses of all the virtual machines. Increasing memory space requirements drive up the implementation cost of the edge network element. Therefore, in embodiments of the disclosure, a virtual switch is disposed between the edge network element and the virtual machine. This enables the edge network element to reduce the required memory space, reducing the implementation cost.

FIG. 1 is a block diagram of a network communication system according to a first embodiment of the disclosure. A network communication system 100 comprises a physical machine 110 and a cloud network 120. The physical machine 110 comprises a virtual switch 114 and virtual machines 112_1-112_K (K is a positive integer). Each of the virtual machines 112_1-112_K is connected to the virtual switch 114. In this and some other embodiments, the physical machine 110 is a server in a common cloud network. Moreover, the virtual machines 112_1-112_K are implemented by software of, for example, VMWare, Xen, Kernel based Virtual Machine (KVM) and VirtualBox.

The cloud network 120 comprises physical switches 140_1 and 140_2. In this and some other embodiments, the physical switches 140_1 and 140_2 are switches in a common network, or switches such as ToRs. The virtual machines 112_1-112_K located in the physical machine 110 are connected to the physical switch 140_1 through the virtual switch 114, and are further connected to the cloud network 120 through the physical switch 140_1.

When one of the virtual machines 112_1-112_K (for example, the virtual machine 112_1) intends to transmit an egress frame, sent by the virtual machine 112_1, to the virtual machine 130, the egress frame is processed by the virtual switch 114. Unlike the conventional frame communication technology, the virtual switch 114, when processing the egress frame, does not mark the address of the destination machine (that is, the virtual machine 130) on the egress frame directly in the header part of the egress frame. Instead, the virtual switch 114 encapsulates the address of the virtual machine 130 into a non-header portion of the frame, such as the data portion of the frame, and inserts into the header an address of a destination switch (that is, the physical switch 140_2) connected to the virtual machine 130.

Because the virtual switch 114 encapsulates the destination machine address in a non-header part of the egress frame, a device receiving the egress frame does not directly using the destination machine address as the next destination for transmission. Accordingly, when the virtual switch 114 forwards the egress frame to the physical switch 140_1, the physical switch 140_1 is configured for forwarding the egress frame to the physical switch 140_2 having the destination switch address in the cloud network 120 according to the attached address of the destination switch (that is, the physical switch 140_2). And then the physical switch 140_2 forwards the egress frame to the destination virtual machine 130 having the destination machine address. In this and some other embodiments, the destination machine address in the egress frame is a MAC address of the destination virtual machine in the cloud network 120, and the destination switch address is a MAC address of the destination physical switch (for example, the physical switch 140_2), connected to the destination virtual machine, in the cloud network 120.

In this and some other embodiments, the virtual switch 114 comprises a first address record table configured for recording MAC addresses of the virtual machines 112_1-112_K, connected to the virtual switch 114, in the physical machine 110. In addition, in this and some other embodiments, the first address record table is also configured for recording a MAC address of the physical switch 140_1, connected to the virtual switch 114, in the cloud network 120.

In this and some other embodiments, the physical switch 140_1 also comprises a second address record table configured for recording MAC addresses of other physical switches in the cloud network 120. At the same time, in this and some other embodiments, the second address record table is also configured for recording a MAC address of the virtual switch 114 connected to the physical switch 140_1.

Therefore, in this embodiment, the virtual switch 114 is disposed between the virtual machines 112_1-112_K and the physical switch 140_1, so that the second address record table on the physical switch 140_1 does not need to record the MAC addresses of all the virtual machines 112_1-112_K on the physical machine 110 connected to the physical switch 140_1, but only records the MAC address of the virtual switch 114. Therefore, when a virtual machine in another physical machine in the cloud network 120 intends to forward an ingress frame (that is, an egress frame sent by the virtual machine in the another physical machine) to one of the virtual machines 112_1-112_K through the physical switch 140_1, the physical switch 140_1 only needs to change the destination switch address of the ingress frame from the MAC address of the physical switch 140_1 to the MAC address of the virtual switch 114.

Hence, the ingress frame is forwarded by the physical switch 140_1 to the virtual switch 114, and after the virtual switch 114 receives the ingress frame, the virtual switch 114 decapsulates the ingress frame by using the destination machine address that is sent initially and encapsulated by the virtual switch on the physical machine, and converts the destination switch address of the ingress frame (that is, the MAC address of the virtual switch 114) into the destination machine address (that is, the MAC address of one of the virtual machines 112_1-112_K). Thereby, the ingress frame is correctly forwarded to one of the virtual machines 112_1-112_K.

"Decapsulation" refers to that the virtual switch 114's use of the destination machine address, initially encapsulated in the ingress frame, as a next destination address for forwarding. During the process of forwarding the ingress frame to the destination machine, in this and other embodiments, only the virtual switch 114 takes the destination machine address as a reference of a destination address for forwarding the frame. Other physical switches, in the middle of the forwarding, do not take the destination machine address as the reference of the destination address for forwarding the frame.

In this and some other embodiments, the virtual switch 114 is implemented by a network server program on the physical machine 110. In this and some other embodiments, since the physical machine 110 is a server comprising a Random Access Memory (RAM) element, the network server program is implemented in this RAM in software manner. Therefore, the space of the first address record table in the virtual switch 114 is configured for having desirable flexibility. In other words, when implementing the virtual switch 114 on the physical machine 110, it is unnecessary to adopt an additional memory (for example, a CAM) to implement the first address record table, so that the first address record table is not limited by hardware (that is, the memory) space.

Figure 2:
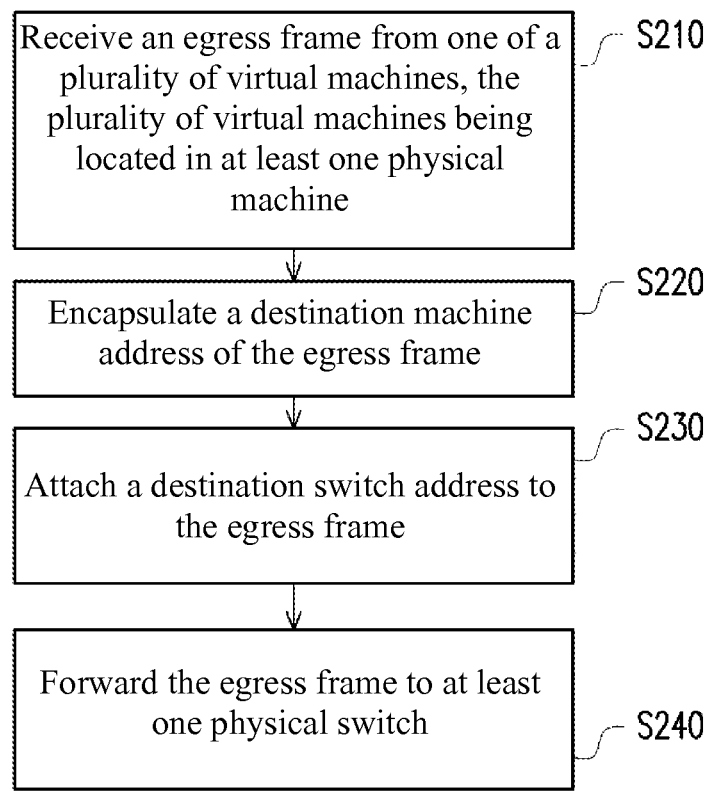
FIG. 2 is a flow chart of a communication method of a network communication system according to the first embodiment of the disclosure.

FIG. 2 is a flow chart of a communication method of a network communication system according to the first embodiment of the disclosure. Referring to FIG. 1 and FIG. 2 at the same time, in step S210, the virtual switch 114 receives an egress frame from one of the virtual machines 112_1~112_K. The virtual machines 112_1-112_K are located in the physical machine 110. In step S220, the virtual switch 114 encapsulates a destination machine address of the egress frame. In step S230, the virtual switch 114 attaches a destination switch address to the egress frame. In step S240, the virtual switch 114 forwards the egress frame to at least one physical switch (for example, the physical switch 140_1) in the cloud network 120.

Figure 3:
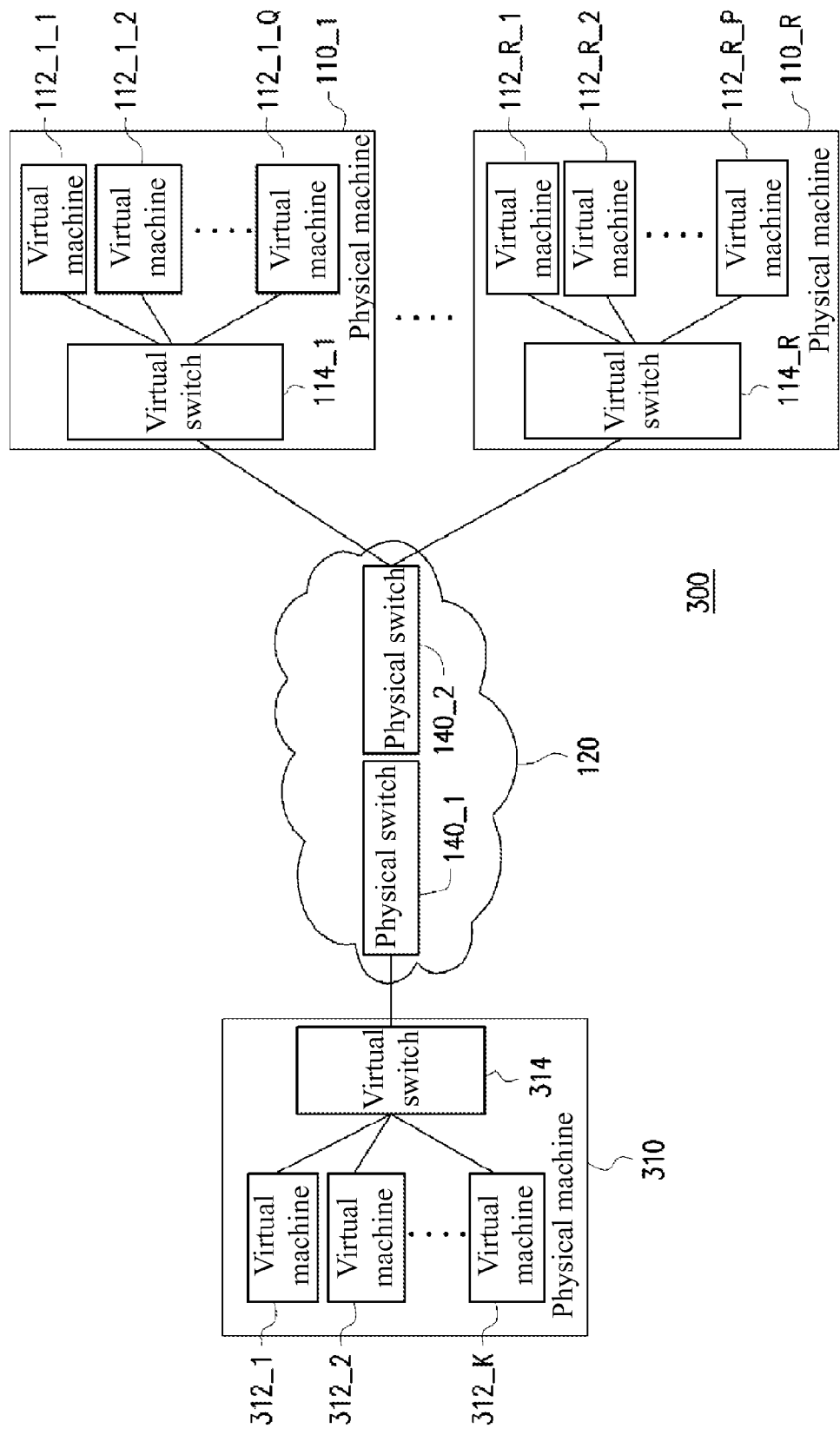
FIG. 3 is a block diagram of a network communication system according to a second embodiment of the disclosure.

FIG. 3 is a block diagram of a network communication system 300 according to a second embodiment of the disclosure. Each virtual machine in physical machines 110_1-110_R (R is a positive integer) is connected to the physical switch 140_2 respectively through virtual switches 114_1~114_R. For example, in the physical machine 110_1, virtual machines 112_1_1-112_1_Q (Q is a positive integer) are connected to the physical switch 140_2 through the virtual switch 114_1. In the physical machine 110_R, virtual machines 112_R 1-112_R_P (P is a positive integer) are connected to the physical switch 140_2 through the virtual switch 114_R.

In this and some other embodiments, the physical machines 110_1-110_R are implemented by a blade server respectively. A plurality of blade servers further form a rack mount server host, and are connected the cloud network 120 through the physical switch 140_2 (that is, the ToR).

The physical switch 140_2 in the cloud network 120 is connected to the physical switch 140_1 through another physical switch in the cloud network 120. The physical switch 140_1 is connected to virtual machines 312_1-312_K in the physical machine 310 through the virtual switch 314. In this and some other embodiments, the other physical switch is a ToR connected to another rack mount server host (formed by another set of blade servers and in this and some other embodiments, each blade server comprises a plurality of virtual machines). In other words, in this and some other embodiments, a plurality of rack mount server hosts communicates with each other through ToRs connected to the rack mount server hosts respectively. Moreover, in this and some other embodiments, a plurality of rack mount server hosts is placed in a container data center, so as to be managed uniformly by equipment maintenance personnel.

In an embodiment of the disclosure, the cloud network 120 further comprises a core network element configured for recording MAC addresses of physical switches in the cloud network 120. On the core network element, a concept of TRILL is configured for reducing record table space, of the core network element, for recording the addresses of the physical switches in the cloud network 120. Therefore, in this and some other embodiments, the cloud network 120 is a TRILL campus network, and each physical switch in the TRILL campus network is a Routing Bridge ("RBridge"), a switch having a routing function, in the TRILL campus network.

For example, when the virtual machine 312_1 in the physical machine 310 intends to communicate with the virtual machine 112_1_Q in the physical machine 110_1, the virtual machine 312_1 is configured for sending an egress frame, carrying a MAC address of the virtual machine 112_1 Q, to the virtual switch 314. After receiving the egress frame, the virtual switch 314 encapsulates the MAC address of the virtual machine 112_1_Q in the egress frame, and attaches a MAC address of the physical switch 140_1 as a next destination switch address. Therefore, in this and some other embodiments, the egress frame sent by the virtual switch 314 to the physical switch 140_1 is considered as frame carrying MAC-in-MAC information.

In other words, in the procedure of forwarding the egress frame to the virtual machine 112_1_Q, for receiving ends (for example, the physical switches 140_1, 140_2 and the virtual switch 114_1), when receiving the egress frame, only the virtual switch 114_1 in the physical machine 110_1 takes the MAC address of the 112_1_Q as the destination address for forwarding. However, during the procedure of transmission, each of the physical switches (for example, the physical switches 140_1 and 140_2) for forwarding the egress frame regards a MAC address of the next destination physical switch, to be forwarded to, as the destination address.

After receiving the egress frame, the physical switch 140_1 is configured for finding, by using a second address record table thereof and a routing function of an RBridge, physical switches through which the egress frame is transmitted to the physical switch 140_2. Therefore, in the procedure of forwarding the egress frame to the virtual machine 112_1_ Q, a destination switch address on the egress frame is changed for several times. In other words, the destination switch address is changed, by a physical switch currently receiving the egress frame, to a MAC address of a next physical switch to which the egress frame is transmitted.

When forwarding the egress frame to the physical switch 140_2 through a plurality of physical switches (that is, RBridges) in the cloud network 120, the physical switch 140_2 is configured for changing the destination switch address of the egress frame to a MAC address of the virtual switch 114_1, and performing forwarding. It should be noted that, the egress frame sent by the virtual machine 312_1 is an ingress frame for the virtual switch 114_1. After receiving the ingress frame, the virtual switch 114_1 is configured for decapsulating a part of encapsulated frame data, so as to obtain the MAC address of the virtual machine 112_1_Q that is encapsulated by the virtual switch 314. Then, the virtual switch 114_1, by querying a first address record table thereof, converts a destination switch address of the ingress frame into the MAC address of the virtual machine 112_1_Q, and sends the ingress frame to the virtual machine 112_1_Q.

Figure 4:
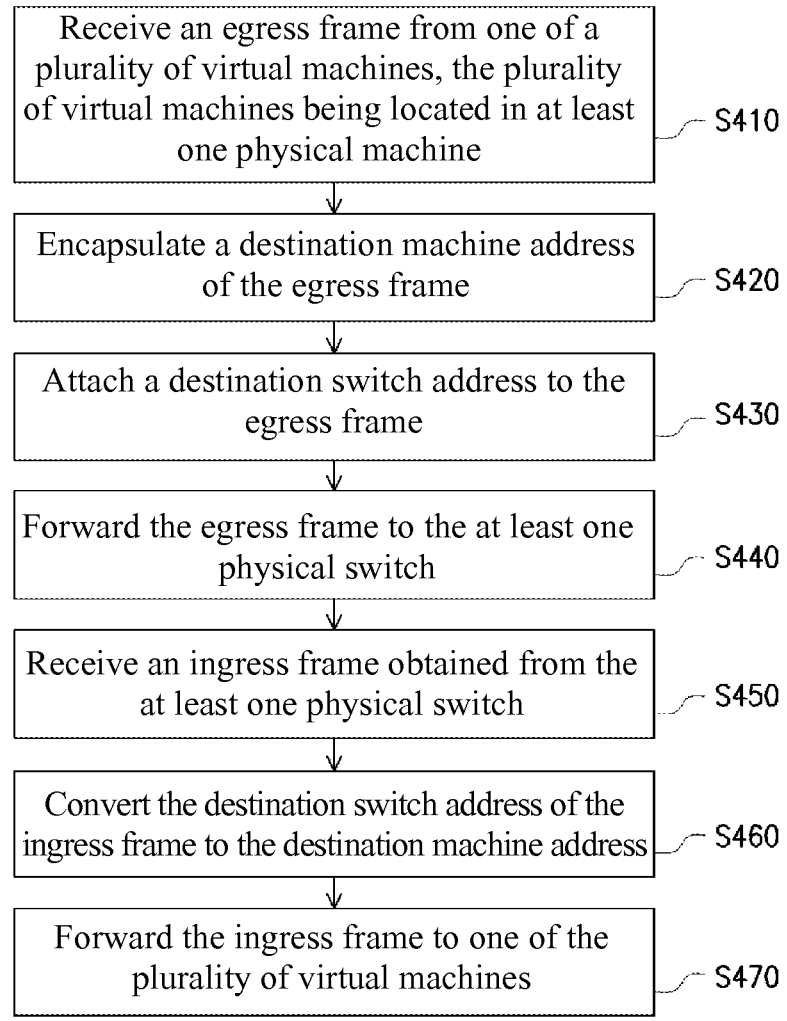
FIG. 4 is a flow chart of a communication method of a network communication system according to the second embodiment of the disclosure.

FIG. 4 is a flow chart of a communication method of a network communication system according to the second embodiment of the disclosure. Referring to FIG. 3 and FIG. 4 at the same time, when the virtual machine 312_1 in the physical machine 310 intends to communicate with the virtual machine 112_1_Q in the physical machine 110_1, in step S410, the virtual switch 314 receives an egress frame from the virtual machine 312_1. In step S420, the virtual switch 314 encapsulates a destination machine address of the egress frame (that is, the MAC address of the virtual machine 112_1_Q). In step S430, the virtual switch 314 attaches a destination switch address (for example, the MAC address of the physical switch 140_1) to the egress frame. In step S440, the virtual switch 314 forwards the egress frame to at least one physical switch (for example, the physical switch 140_1) in the cloud network 120.

After the forwarding through the plurality of physical switches in the cloud network 120, in step S450, the virtual switch 114_1 receives the ingress frame (that is, the egress frame sent by the virtual machine 312_1) obtained by the physical switch 140_2. In step S460, the virtual switch 114_1 decapsulates the ingress frame, so as to obtain a destination machine address. Then, the virtual switch 114 1 converts a destination switch address in the ingress frame (that is, the MAC address of the virtual switch 114_1) into the destination machine address (that is, the MAC address of the virtual machine 112_1_Q). In step S470, the virtual switch 114_1 forwards the ingress frame to the virtual machine 112_1_Q.

In view of the above, in the network communication system according to the embodiments of the disclosure, each of the virtual machines needs to be connected to the physical switch through the virtual switch disposed inside the physical machine, so that the physical switch is configured for achieving frame transferring of the cloud network by only requiring to record a machine address of the virtual switch in the physical machine connected to the physical switch. Therefore, by effectively reducing the storage space, for recording the machine addresses, in the physical switch, a manufacturer is configured for selecting a memory having lower storage capacity (for example, a CAM) to setup a physical switch. Thereby, the cost is reduced. In addition, since the virtual switch is configured for being implemented, in an existing memory (for example, a RAM) in the physical machine, in a software manner of network server program. Thus, extra system cost is not required.

What is claimed is:

1. A network communication system, comprising:
a cloud network comprising at least one physical switch; and
at least one physical machine, each the physical machine comprising a plurality of virtual machines and a virtual switch, each of the virtual machines being connected to the at least one physical switch in the cloud network through the virtual switch,
wherein the virtual switch encapsulates a destination machine address of an egress frame sent by the virtual machines, attaches a destination switch address to the egress frame to be forwarded to the at least one physical switch, and receives and analyzes an ingress frame obtained from the at least one physical switch, so as to convert the destination switch address of the ingress frame to the destination machine address, for forwarding the ingress frame to one of the virtual machines.

2. The network communication system according to claim 1, wherein the virtual switch comprises a first address record table configured for recording media access control (MAC) addresses of the virtual machines and the at least one physical switch connected to the virtual machines.

3. The network communication system according to claim 2, wherein the at least one physical switch comprises a second address record table configured for recording a MAC address of every physical switch in the cloud network.

4. The network communication system according to claim 1, wherein the destination machine address of the egress frame is a MAC address of a destination virtual machine in the cloud network.

5. The network communication system according to claim 4, wherein the destination switch address of the egress frame is a MAC address of a destination physical switch, connected to the destination virtual machine, in the cloud network.

6. A network communication method configured for at least one physical machine in a network communication system, the network communication method comprising:
receiving an egress frame from one of a plurality of virtual machines, the virtual machines being located in the at least one physical machine;
encapsulating a destination machine address of the egress frame;
attaching a destination switch address to the egress frame;
forwarding the egress frame to at least one physical switch;
receiving an ingress frame obtained from the at least one physical switch;
converting the destination switch address of the ingress frame to the destination machine address; and
forwarding the ingress frame to one of the virtual machines.

7. The network communication method according to claim 6, wherein the at least one physical machine comprises the virtual machines and a virtual switch, and the virtual switch is a network server program configured for implementing the network communication method.

8. The network communication method according to claim 7, wherein the virtual switch comprises a first address record table configured for recording media access control (MAC) addresses of the virtual machines and the at least one physical switch connected to the virtual machines.

9. The network communication method according to claim 8, wherein the at least one physical switch comprises a second address record table configured for recording a MAC address of each physical switch in the cloud network.

10. A network communication system comprising:
a plurality of physical machines, each physical machine configured to host a plurality of virtual machines and a virtual switch that connects the virtual machines to the network; and
a cloud network comprising a plurality of physical switches adapted to enable the physical machines to communicate with each other;
wherein:
each virtual machine on an originating physical machine is configured to send an egress frame that includes an ultimate destination address of a destination virtual machine hosted on a destination physical machine;
the virtual switch on the originating physical machine is configured to receive the egress frame and encapsulate the ultimate destination address with an intermediate destination address of one of the plurality of physical switches, thereby transforming the egress frame into a frame that carries both the ultimate destination address and the intermediate destination address;
each physical switch that receives the egress frame, except for a last one of a plurality of physical switches that receives the egress frame, is configured to substitute the intermediate destination address that represents itself with an intermediate destination address of a next one of the plurality of physical switches;
the last physical switch that receives the egress frame is configured to substitute the intermediate destination that represents itself with an intermediate destination address of the virtual switch on the destination physical machine; and the virtual switch on the destination physical machine is configured to receive the frame from the last physical switch, decapsulate it, thereby transforming the frame into one that carries the ultimate destination address but no longer carries an intermediate address, and send the frame to the virtual machine at the ultimate destination address.

11. The network communication system of claim 10, wherein each virtual switch carries a first address record table.

12. The network communication system of claim 11, wherein for each virtual switch, the first address record table includes an address of each virtual machine connected to the virtual switch.

13. The network communication system of claim 12, wherein for each virtual switch, the first address record table includes an address of a physical switch connected to the virtual switch.

14. The network communication system of claim 13, wherein each physical switch carries a second address record table.

15. The network communication system of claim 14, wherein the second address record table includes addresses of other physical switches in the network.

16. The network communication system of claim 15, wherein at least some of the second address record tables include an address of a virtual switch connected to the physical switch.

17. The network communication system of claim 16, wherein the ultimate destination address is a MAC address.

18. The network communication system of claim 17, wherein the intermediate destination addresses are MAC addresses.

19. The network communication system of claim 18, wherein each virtual switch is a network server program running on the corresponding physical machine.

* * * * *